(12) United States Patent
Zeller et al.

(10) Patent No.: US 10,397,852 B2
(45) Date of Patent: Aug. 27, 2019

(54) METHOD FOR ACCESS RESOURCE MANAGEMENT OF MOBILE TRANSCEIVER BY BASE STATION TRANSCEIVER AND APPARATUS ASSOCIATED THEREWITH

(71) Applicant: Alcatel Lucent, Boulogne Billancourt (FR)

(72) Inventors: Dietrich Karl Zeller, Stuttgart (DE); Uwe Doetsch, Stuttgart (DE)

(73) Assignee: Alcatel Lucent, Nozay (FR)

( * ) Notice: Subject to any disclaimer, the term of this patent is extended or adjusted under 35 U.S.C. 154(b) by 168 days.

(21) Appl. No.: 15/117,996

(22) PCT Filed: Jan. 16, 2015

(86) PCT No.: PCT/EP2015/050737
§ 371 (c)(1),
(2) Date: Aug. 10, 2016

(87) PCT Pub. No.: WO2015/121019
PCT Pub. Date: Aug. 20, 2015

(65) Prior Publication Data
US 2017/0181058 A1    Jun. 22, 2017

(30) Foreign Application Priority Data

Feb. 12, 2014    (EP) ..................................... 14305181

(51) Int. Cl.
*H04W 48/08*        (2009.01)
*H04W 72/04*        (2009.01)
(Continued)

(52) U.S. Cl.
CPC ............. *H04W 48/08* (2013.01); *H04W 4/06* (2013.01); *H04W 72/0446* (2013.01);
(Continued)

(58) Field of Classification Search
CPC ... H04W 48/08; H04W 72/0453; H04W 4/06; H04W 72/0446; H04W 12/08; H04L 63/104
See application file for complete search history.

(56) References Cited

U.S. PATENT DOCUMENTS 7,044,389 B2 * 5/2006 Nishizawa ......... G06K 19/0719
                                                        235/441
7,652,984 B1 * 1/2010 Kotecha .............. H04L 12/4633
                                                        370/217
(Continued)

FOREIGN PATENT DOCUMENTS

EP          1 954 087 A1    8/2008
EP          2 670 206 A1    12/2013
(Continued)

OTHER PUBLICATIONS

Sesia et al., "LTE—The UMTS Long Term Evolution: From Theory to Practice," Wiley & Sons, pp. 57-64, 2011.
(Continued)

*Primary Examiner* — Ajay Cattungal
(74) *Attorney, Agent, or Firm* — Fay Sharpe LLP

(57) ABSTRACT

Embodiments provide apparatuses, methods and a computer programs for a base station transceiver and a mobile transceiver. An apparatus for a base station transceiver of a communication system comprises a transceiver module operable to communicate radio signals with a plurality of mobile transceivers using a plurality of radio resources. The apparatus further comprises a control module operable to control the transceiver module, and operable to receive access messages from a first subgroup of one or more mobile transceivers from the plurality of mobile transceivers using a first subgroup of the plurality of radio resources. The control module is further operable to receive access messages from a second subgroup of one or more mobile
(Continued)

transceivers from the plurality of mobile transceivers using a second subgroup of the plurality of radio resources. An apparatus for a mobile transceiver of a communication system is also provided as well as methods associated therewith.

20 Claims, 6 Drawing Sheets

(51) Int. Cl.
H04W 4/06 (2009.01)
H04L 29/06 (2006.01)
H04W 12/08 (2009.01)
(52) U.S. Cl.
CPC ....... *H04W 72/0453* (2013.01); *H04L 63/104* (2013.01); *H04W 12/08* (2013.01)

(56) References Cited

U.S. PATENT DOCUMENTS

| | | | | |
|---|---|---|---|---|
| 7,971,791 | B2* | 7/2011 | Nishizawa | G06K 19/077 235/487 |
| 2003/0035466 | A1* | 2/2003 | Proctor, Jr. | H04B 1/707 375/146 |
| 2004/0151141 | A1* | 8/2004 | Proctor, Jr. | H04B 7/2628 370/335 |
| 2006/0179472 | A1* | 8/2006 | Chang | H04L 63/10 726/2 |
| 2006/0236408 | A1* | 10/2006 | Yan | G06F 21/6218 726/29 |
| 2006/0256839 | A1 | 11/2006 | Tsai et al. | |
| 2007/0211787 | A1 | 9/2007 | Harris et al. | |
| 2007/0297367 | A1 | 12/2007 | Wang et al. | |
| 2008/0056213 | A1* | 3/2008 | Kao | H04W 48/14 370/338 |
| 2009/0298523 | A1* | 12/2009 | Ogawa | H04W 72/04 455/509 |
| 2010/0169751 | A1* | 7/2010 | Sun | H04L 1/0072 714/807 |
| 2012/0040566 | A1* | 2/2012 | Wang | H01R 12/721 439/660 |
| 2013/0174277 | A1* | 7/2013 | Kiukkonen | H04L 63/104 726/28 |
| 2013/0262203 | A1* | 10/2013 | Frederick | G06Q 30/0209 705/14.12 |
| 2013/0301541 | A1 | 11/2013 | Mukherjee et al. | |
| 2014/0003320 | A1 | 1/2014 | Etemad et al. | |
| 2015/0081928 | A1* | 3/2015 | Wintzell | G06F 9/4411 710/8 |
| 2015/0088624 | A1* | 3/2015 | Frederick | G06Q 30/0209 705/14.12 |

FOREIGN PATENT DOCUMENTS

| | | | | |
|---|---|---|---|---|
| EP | 2670206 | A1 * | 12/2013 | ........ H04W 74/0833 |
| EP | 2670206 | A1 * | 12/2013 | ........ H04W 74/0833 |

OTHER PUBLICATIONS

International Search Report for PCT/EP2015/050737 dated May 15, 2015.
PCT Pat. App. No. PCT/EP2015/050737, Written Opinion of the International Searching Authority, dated May 15, 2015, 6 pp.
European Pat. App. 14305181.1, Extended European Search Report, dated Jun. 24, 2014, 7 pp.

* cited by examiner first subgroup second subgroup

METHOD FOR ACCESS RESOURCE MANAGEMENT OF MOBILE TRANSCEIVER BY BASE STATION TRANSCEIVER AND APPARATUS ASSOCIATED THEREWITH

TECHNICAL FIELD

Embodiments relate to apparatuses, methods and computer programs for a base station transceiver and a mobile transceiver, more particularly but not exclusively, to efficient access resource management in mobile communication systems.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Mobile communication for Public Safety and Disaster Recovery (PSDR), as used for example by police, fire and rescue services, are based on communications systems known as Professional Mobile Radio (PMR) or Land Mobile Radio (LMR). However these systems may provide restricted bandwidth services so there is some intent to move towards providing such services using mobile networks based on Long Term Evolution (LTE) and LTE-Advanced (LTE-A) cellular radio technology, which may provide higher bandwidth and higher data rate services.

A nationwide rollout of broadband networks based on LTE for PSDR in parallel to deployed commercial cellular networks may be considered inefficient regarding costs involved.

Document EP 2 670 206 A1 discloses methods and network elements partitioning at least a subset of contention based resources for random access attempts into a plurality of partitions. Document US 2007/0211787 A1 describes a concept which may serve to improve spreading channel code selection in wireless technologies that employ two-stage ranging. Document EP 1 954 087 A1 outlines method and apparatus for reducing collisions during an access procedure between a plurality of user equipments in a radio communication system. Document US 2007/0297367 A1 is concerned with ciphering of signaling messages.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections.

Various embodiments provide an apparatus, a method and a computer program for a base station transceiver and an apparatus, a method and a computer program for a mobile transceiver.

Embodiments may provide an efficient concept for sharing acquisition resources for multiple user groups in a communication network. Mobile transceivers may be assigned to or associated with different subgroups of mobile transceivers. The different subgroups of mobile transceivers may use different radio resources for accessing a communication system. Embodiments may therefore enable efficient resource management in a communication network among different groups or subgroups of users.

Embodiments provide an apparatus for a base station transceiver of a communication system. The base station transceiver apparatus comprises a transceiver module, which is operable to communicate radio signals with a plurality of mobile transceivers using a plurality of radio resources. The base station transceiver apparatus further comprises a control module, which is operable to control the transceiver module. The control module is operable to receive access messages from a first subgroup of one or more mobile transceivers from the plurality of mobile transceivers using a first subgroup of the plurality of radio resources, and the control module is operable to receive access messages from a second subgroup of one or more mobile transceivers from the plurality of mobile transceivers using a second subgroup of the plurality of radio resources. Embodiments may enable efficient resource management by using different subgroups of radio resources for different subgroups users or mobile transceivers.

In embodiments the first subgroup of one or more mobile transceivers from the plurality of mobile transceivers and the second subgroup of one or more mobile transceivers from the plurality of mobile transceivers may comprise different mobile transceivers. Embodiments may enable a differentiation of mobile transceivers and access radio resources used by different mobile transceivers. For example, the first subgroup of one or more mobile transceivers from the plurality of mobile transceivers and the second subgroup of one or more mobile transceivers from the plurality of mobile transceivers may correspond to different classes of users, where the classes of users may be non-overlapping. In some embodiments a mobile transceiver or user may be assigned to a single class. Embodiments may enable classification of users and resource management between the different classes.

The first subgroup of radio resources from the plurality of radio resources and the second subgroup of radio resources from the plurality of radio resources may be non-overlapping in some embodiments. For example, the first subgroup of radio resources from the plurality of radio resources and the second subgroup of radio resources from the plurality of radio resources may be comprised in or may constitute different access channels. Embodiments may enable utilization of different access channels or different radio resources in general for different subgroups of users or mobile terminals. In embodiments the plurality of radio resources may correspond to time and frequency resources of a carrier of the communication system. Embodiments may hence enable resource management within one or more carriers of a communication system.

Embodiments provide an apparatus for a mobile transceiver of a communication system. The mobile apparatus comprises a transceiver module, which is operable to communicate radio signals with a base station transceiver using a plurality of radio resources. The mobile transceiver apparatus further comprises a control module, which is operable to control the transceiver module. The control module is operable to obtain information related to a subgroup of one or more mobile transceivers the mobile transceiver is associated with. The control module is further operable to transmit an access message to a base station transceiver using a subgroup of the plurality of radio resources. The subgroup of radio resources is based on the information related to the subgroup the mobile transceiver is associated with. Embodiments may enable to control access resources used by a mobile transceiver through respective subgroup assignment of the mobile transceiver and respective radio resource assignment to such a subgroup.

In some embodiments the control module of the base station transceiver apparatus may be operable to broadcast information related to the first subgroup of radio resources from the plurality of radio resources and information related to the second subgroup of radio resources from the plurality of radio resources. The control module of the mobile transceiver apparatus may be operable to receive information related to the subgroup of radio resources from the base station transceiver. Embodiments may enable a base station transceiver to communicate or influence the access radio resources assigned to the subgroups of users and therewith enable an enhanced security of access resource assignments. For example, the control module of the base station transceiver apparatus may be operable to secure the information related to the second subgroup of radio resources from the plurality of radio resources based on access information shared with the second subgroup of mobile transceivers. Embodiments may enable enhanced security on the detectability of access radio resources of a subgroup of a mobile transceiver by applying security measures such as, for example, changing the resources, managing access information on what are these resources, encryption, scrambling etc.

Accordingly, the control module of the mobile transceiver apparatus may be operable to determine the subgroup of radio resources based on access information received from the base station transceiver in some embodiments. Additionally or alternatively, the control module of the mobile transceiver apparatus may be operable to determine the subgroup of radio resources based on access information from a storage module comprised in the mobile transceiver. For example, access information may, for example, be tied to user identification, a subscriber identity module, a security token, etc.

The control module of the base station transceiver apparatus may be operable to keep the access information unknown to the first subgroup of mobile transceivers in some embodiments. For example, the control module may be operable to provide information related to the access information to the second subgroup of mobile transceivers using a communication path dedicated to one or more mobile transceivers of the second subgroup of mobile transceivers. Embodiments may provide a mechanism to selectively provide access information for access resources to a subgroup of mobile transceivers. The control module of the base station transceiver apparatus may be operable to vary the second subgroup of radio resources over time, for example, the control module may be operable to vary the second subgroup of radio resources in a time-frequency hopping scheme. In the mobile transceiver apparatus the control module may be operable to determine the respective subgroup of radio resources according to a time-frequency hopping scheme.

Embodiments may enable time and/or frequency changing access radio resources for a subgroup of mobile transceivers and therewith provide enhanced security as access radio resources change over time. Even if information on the access radio resources gets compromised the changing over time may prevent long term abuse by non-authorized mobile transceivers or users.

In some embodiments the control module of the mobile transceiver apparatus may be operable to receive information related to the subgroup the mobile transceiver is associated with from the base station transceiver. Embodiments may enable assignment changes of mobile transceivers to the subgroups. The control module of the mobile transceiver may be operable to obtain the information related to the subgroup the mobile transceiver is associated with from a storage module comprised in the mobile transceiver. Embodiments may enable group assignment to be communicated or implemented in the mobile transceiver in a more static way, such as, for example, in the manufacturing process of the mobile, with an identification card, an authorization code, security token, etc.

Embodiments provide a method for a base station transceiver of a communication system. The method comprises receiving access messages from a first subgroup of one or more mobile transceivers from the plurality of mobile transceivers using a first subgroup of the plurality of radio resources. The method further comprises receiving access messages from a second subgroup of one or more mobile transceivers from the plurality of mobile transceivers using a second subgroup of the plurality of radio resources.

Embodiments further provide a method for a mobile transceiver of a communication system. The method comprises obtaining information related to a subgroup one or more mobile transceivers the mobile transceiver is associated with. The method further comprises transmitting an access message to a base station transceiver using a subgroup of a plurality of radio resources. The subgroup of radio resources is based on the information related to the subgroup the mobile transceiver is associated with.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
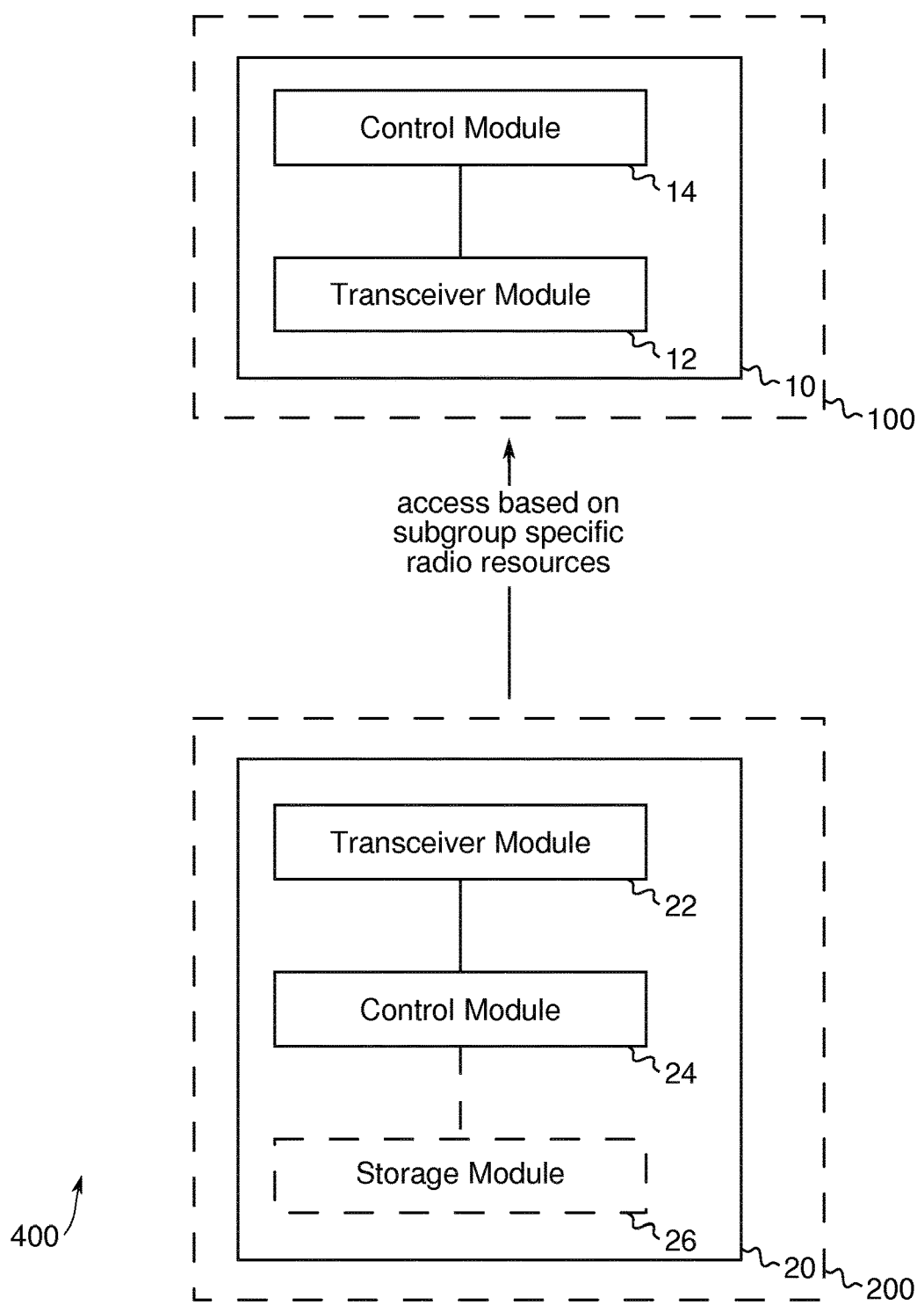
FIG. 1 illustrates a block diagram of an embodiment of an apparatus for a base station transceiver and a block diagram of an embodiment of an apparatus for a mobile transceiver.

In the following some embodiments of apparatuses, methods and computer programs for base station transceivers and mobile transceivers will be described. FIG. 1 illustrates a block diagram of an embodiment of an apparatus 10 for a base station transceiver 100. In other words, the apparatus 10 may be adapted to or operable in a base station transceiver 100; the apparatus 10 may be operated or comprised in a base station transceiver 100. Embodiments may also provide a base station transceiver 100 comprising the apparatus 10. FIG. 1 further shows an embodiment (dashed lines) of a base station transceiver 100 comprising the apparatus 10. The base station transceiver 100 can be operative in a mobile communication system 400. In other words, the base station transceiver 100, its apparatus 10, respectively, can be adapted, operable, or configured to comply with the mobile communication system 400.

The mobile communication system 400 may, for example, correspond to one of the Third Generation Partnership Project (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system 400 comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point etc., which may be further subdivided in a remote unit and a central unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in embodiments the mobile communication system 400 may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

As shown in FIG. 1, the base station transceiver apparatus 10 comprises a transceiver module 12, which is operable to communicate radio signals with a plurality of mobile transceivers 200 using a plurality of radio resources. The transceiver module 12 may correspond to one or more transceiver devices, one or more transceiver units, any means for transceiving, i.e. receiving and/or transmitting etc., and it may comprise typical receiver and transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more transmit or receive antennas, etc. As will be further detailed subsequently, the plurality of radio resources may correspond to time and/or frequency radio resources. Time radio resources may correspond to one or more radio frames, sub-frames, slots, symbols, etc. Frequency radio resources may correspond to one or more carriers, sub-carries, bands, sub-bands, frequency channels or sub-channels, etc.

The base station transceiver apparatus 10 further comprises a control module 14, which is coupled to the transceiver module 12. The control module 14 is operable to control the transceiver module 12. The control module 14 is further operable to receive access messages from a first subgroup of one or more mobile transceivers from the plurality of mobile transceivers using a first subgroup of the plurality of radio resources. The control module 14 is further operable to receive access messages from a second subgroup of one or more mobile transceivers from the plurality of mobile transceivers using a second subgroup of the plurality of radio resources. In embodiments the control module 14 may use or control the transceiver module 12 to receive signals or messages. In embodiments the control module 14 may be implemented using one or more control units, control devices, any means for controlling, such as a processor, a computer or a programmable hardware component being operable with accordingly adapted software.

In other words, the above described functions of the control module 14 may as well be implemented in software, which is then executed on one or more programmable hardware components. Such hardware components may comprise a general purpose processor, a Digital Signal Processor (DSP), a micro-controller, etc. A message may correspond to any information, which may be represented by one or more binary digits, such as bits, a radio signal, an information element, etc. For example, an access message may correspond to any piece of information initially transmitted by a mobile transceiver to set up a connection to a network, such as a random access pre-amble.

FIG. 1 also illustrates an embodiment of an apparatus 20 operable in a mobile transceiver 200 of a mobile communication system 400. In other words, the apparatus 20 may be adapted to or operable in a mobile transceiver 200; and may be operated or comprised in a mobile transceiver 200. Embodiments also provide a mobile transceiver 200 comprising the apparatus 20. FIG. 1 further shows an embodiment (dashed lines) of a mobile transceiver 200 comprising the apparatus 20. The apparatus 20 comprises a transceiver module 22. The transceiver module 22 may correspond to a similar transceiver module 12 as described above, however, adapted to a mobile transceiver 200, comprising the above described typical transceiver components. In a similar manner, the transceiver module 22 may be implemented as one or more transceiver devices, one or more transceiver units, any means for transceiving, i.e. receiving and/or transmitting etc. The transceiver module 22 is operable to communicate radio signals with the base station transceiver 100 using the plurality of radio resources, in line with the above description.

The transceiver module 22 is coupled to a control module 24. The control module 24 is operable to control the transceiver module 22. The control module 24 is further operable to obtain information related to a subgroup of one or more mobile transceivers the mobile transceiver 200 is associated with. The control module 24 is further operable to transmit an access message to a base station transceiver 100 using a subgroup of the plurality of radio resources, wherein the subgroup of radio resources is based on the information related to the subgroup the mobile transceiver 100 is associated with. As further indicated in FIG. 1 the mobile transceiver apparatus 20 may access service of the mobile communication system 400 as provided by the base station transceiver apparatus 10 based on subgroup specific radio resources. In embodiments the control module 24 may be implemented in a similar manner as the above described control module 14 for the base station transceiver 100, the control module 24 may, however, be adapted to the mobile transceiver 200. Embodiments may also provide a system comprising a base station transceiver apparatus 10 and a mobile transceiver apparatus 20 as shown in FIG. 1. As shown in FIG. 1 the mobile transceiver apparatus 20 may further comprise an optional storage module 26, which is coupled to the control module 24.

In other words, embodiments may allow sharing of networks, frequencies, network sites, network equipment between commercial networks operators and, for example, PSDR network operators or even to allow PSDR network operators acting as Mobile Virtual Network Operators (MVNO) using commercial networks. In general, any grouping of mobile transceivers may be carried out in embodiments, other examples are grouping of mobiles associated to different providers, e.g. MVNOs, sharing the same network, mobiles subscribed to different service classes, such as silver, gold, and platin users, different priorities of users, e.g. officials such as fire fighters, police, emergency aid, civil protection, disaster control, emergency management, etc.

For example, such a sharing might currently be assumed to be not compliant with the extreme availability and accessibility as demanded for PSDR. E.g. it may be considered a common experience of mobile communications users that in crowded areas, at traffic jams, at times of large communication demands (e.g. midnight at new year's eve) networks get congested preventing to get connected or at least delaying connection very long. Of course if PSDR users would share such infrastructure too, they would observe the same impairments, which might not be acceptable.

Figure 2:
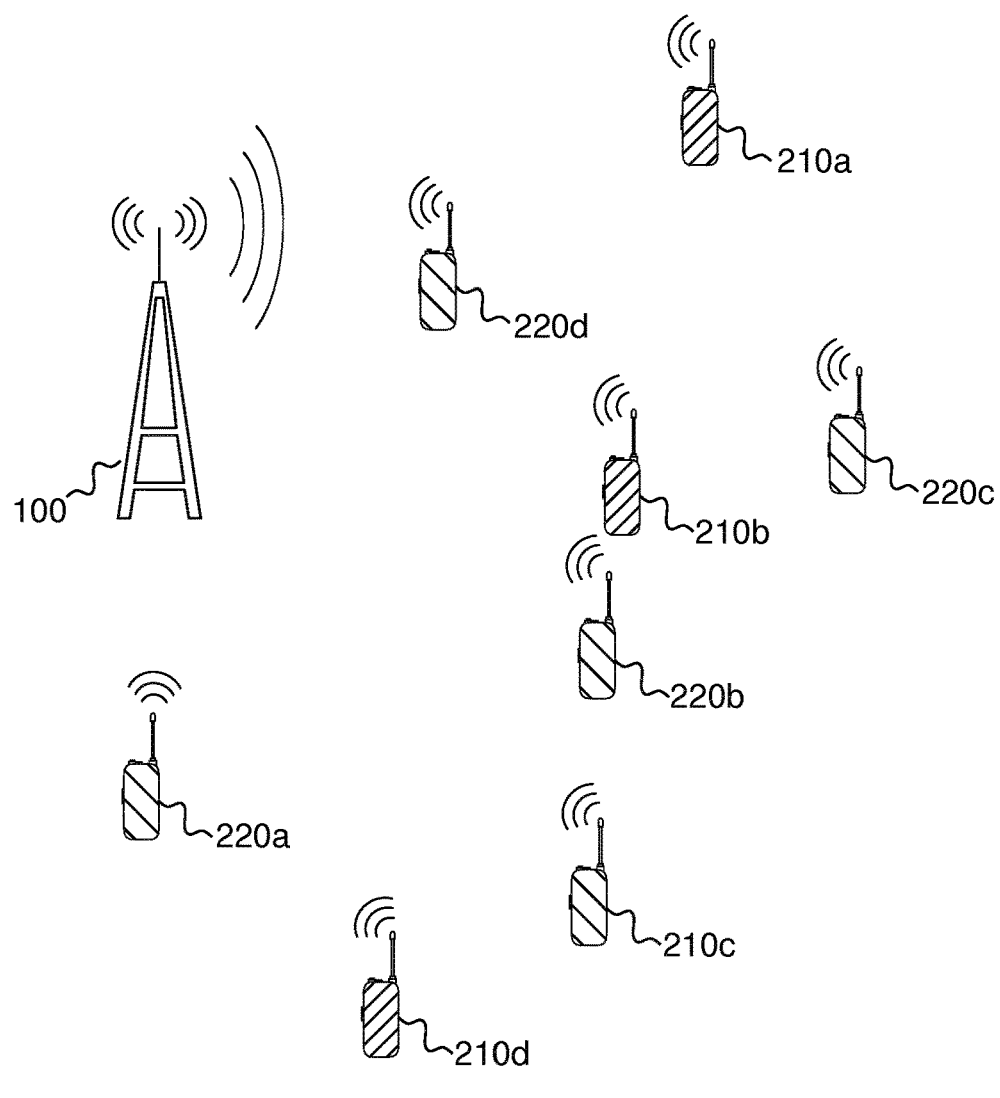
FIG. 2 shows a network structure with embodiments.
Figure 2:
Figure 2:

FIG. 2 shows a network structure with embodiments of a base station transceiver 100 and multiple mobile transceivers 210a-d and 220a-d. The mobile transceivers 210a-d are assigned to or associated with a first subgroup and the mobile transceivers 220a-d are assigned to or associated with a second subgroup. The first and second subgroups of mobile transceivers are further differentiated by different hachures in FIG. 2. In line with the above description, access radio resources of the mobile transceivers of the two subgroups are different. The plurality of radio resources corresponds to time and frequency resources of a carrier of the communication system 400 in this embodiment. The first subgroup of radio resources from the plurality of radio resources and the second subgroup of radio resources from the plurality of radio resources are non-overlapping, i.e. the subgroups of radio resources used by the subgroups of mobile transceivers are disjunct in this embodiment.

In the embodiment shown in FIG. 2 the first subgroup of one or more mobile transceivers 210a-d from the plurality of mobile transceivers and the second subgroup of one or more mobile transceivers 220a-d from the plurality of mobile transceivers comprise different mobile transceivers. In this embodiment the first and second subgroups of one or more mobile transceivers are non-overlapping. The first subgroup of one or more mobile transceivers 210a-d from the plurality of mobile transceivers and the second subgroup of one or more mobile transceivers 220a-d from the plurality of mobile transceivers correspond to different classes of users. For example, the mobile transceivers 220a-d of the second subgroup may correspond to PSDR users. The embodiment may ensure that PSDR users would have guaranteed and prioritized access to a commercial LTE network 400, which is further represented by base station transceiver 100 in FIG. 2.

It is to be noted that additional mechanisms may be in place in embodiments. For example, in 3GPP mechanisms access control for emergencies are foreseen. This access control mechanism "Access Class Baring" as described in Technical Specification (TS) 22.011 allows broadcasting to terminals access restrictions for so called "Access Classes". These restrictions may regulate per access class if a terminal is allowed accessing a cell via random access or not. In embodiments such a mechanism may be used on top of the above. Such additional measures may be meant as reactive measure in case of emergencies and they might not be suited for regular sharing of the access. Further, such an access class baring, when applied without the above described subgrouping, may allow access to misbehaving UEs or even active denial of service attacks against a network. This might be seen critical with respect to communication services for PSDR on which the rescue of lives might depend. In embodiments, the first subgroup of radio resources from the plurality of radio resources and the second subgroup of radio resources from the plurality of radio resources may be comprised in different access channels. For example, different Random Access Channels (RACHs) may be used for different subgroups of mobile transceivers.

Embodiments may allow a network prioritizing access attempts by terminals in a secure way. The subdivision of the mobile transceivers or UEs in multiple subgroups, which use a concurrent random access procedure based on random attempts of all the users in a subgroup on the same access resources to gain access, may allow separate control of the subgroups using different access resources. Embodiments may overcome critical situations in which resulting collisions cannot be resolved once too many colliding concurrent access attempts are occurring, when all users use the same set of access resources and a random access channel becomes congested.

Embodiments may reduce or even prevent collisions between different user classes by providing different access channels for the different user classes (e.g. one user class could be normal cellular broadband users and another class PSDR users), for which at least the access channels for critical user classes (e.g. PSDR users) may be further secured against the other user classes, misbehaving UEs and other threats.

In further embodiments the control module 14 of the base station transceiver apparatus 10 may be operable to broadcast information related to the first subgroup of radio resources from the plurality of radio resources and information related to the second subgroup of radio resources from the plurality of radio resources. The control module 24 of the mobile transceiver apparatus 20 may be operable to receive information related to the subgroup of radio resources from the base station transceiver 100. In other words, a mobile transceiver 200 may determine or obtain information related to access radio resources for the subgroup it is associated with at least partly based on information provided by the base station transceiver 100. As will be detailed subsequently, subgroup association and/or information related to the radio resources used within a subgroup may be based on multiple pieces of information, one or more of which may be provided by the base station transceiver apparatus 10.

In embodiments different subgroup assignment or association schemes are conceivable. In some embodiments the control module 24 of the mobile transceiver apparatus 20 may be operable to receive information related to the subgroup the mobile transceiver is associated with from the base station transceiver 100. For example, group assignment or association may be carried out dynamically, e.g. based on a load situation in the network or a load situation of the respective access resources of a group the base station transceiver apparatus 10 may change such group assignment. Dynamic regrouping may be used in some embodiments in a secure way in order to avoid misuse by an attacker. For example, encryption using keys, which may be available only to certain users (e.g. from a storage module 26) may be used to encrypt/decrypt the information related to the subgroup. In other words, embodiments may have mechanisms in place to avoid misuse by an attacker, such as changing the assignment to "downgrade" users belonging to a prioritized user group like PSDR users to a non-prioritized user group. In some embodiments the allocation of a terminal to a specific subgroup may be bound during the manufacturing process, by a personalization process or by means of a user group specific storage module 26, as will be detailed subsequently.

Information may be provided to the mobile transceivers based on which they may determine their subgroup assignment in some embodiments. For example, an identification of a mobile transceiver may be used together with information provided by the base station transceiver apparatus 10 to determine subgroup assignment. Such identification information of a mobile transceiver may be stored on a storage module 26 of the mobile transceiver apparatus 20. In other words, in some embodiments the control module 24 may be operable to obtain the information related to the subgroup the mobile transceiver is associated with from a storage module 26 comprised in the mobile transceiver 200.

The storage module 26 may correspond to one or more memory or storage units, devices, any means for storing, such as, for example, a Read Only Memory (ROM), Random Access Memory (RAM), non-volatile storage, flash memory, etc. In some embodiment the storage module 26 may be comprised in a Subscriber Identity Module (SIM), a Universal SIM (USIM), etc., which is comprised in the mobile transceiver 200. Such storage module 26 may store an identity of a subscriber, user or mobile transceiver, which may be unique. For example, the identification may be stored in the storage module 26 during the manufacturing of the mobile transceiver 200, the manufacturing of the storage module 26, etc.

In some embodiments the signaling of the access channel resources may be secured. For securing the information related to the respective access resources measures on different levels, e.g. on different layers in a protocol stack of the communication system 400, may be applied. Subsequently, several levels or variants of security methods or measure will be described, which may be applied separately or in any combination in embodiments. In embodiments, a level of needed security may depend on the required security level inside a critical user class or subgroup of mobile transceivers.

Figure 3:
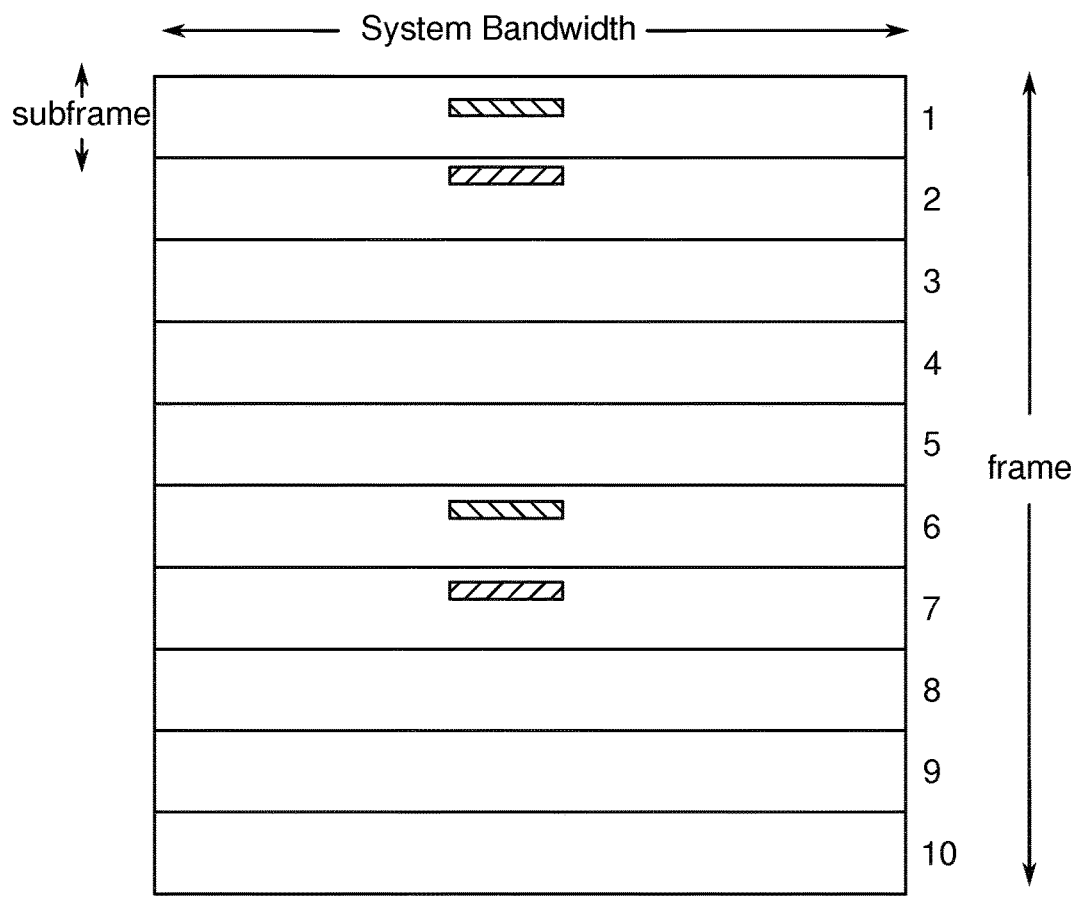
FIG. 3 illustrates an embodiment with access resource separation for different user subgroups.

In some embodiments separate access channels for different user classes may be used. In other words, the access radio resources assigned to the different subgroups of mobile transceivers may constitute or be comprised in different channels. FIG. 3 illustrates an embodiment with access resource separation for different user subgroups. FIG. 3 illustrates an embodiment of an LTE or LTE-A communication system 400, wherein the first subgroup of mobile transceivers corresponds to commercial network users and the second subgroup of mobile transceivers corresponds to PSDR network users. FIG. 3 depict a view chart of a radio resources plane, where the top-bottom extension represents a radio frame of a repetitive radio frame structure, where a radio frame is subdivided in multiple sub-frames, e.g. ten sub-frames as numbered in FIG. 3. The left-right extension of the view chart in FIG. 3 represents the system bandwidth, which may be subdivided in a plurality of sub-barriers (not shown in FIG. 3 for ease of illustration).

As further shown in FIG. 3 access resources for the two subgroups of mobile transceivers correspond to RACH access resources on the same frequency but in different sub-frames, which are differentiated by different hachures. In other words, the mobile transceivers of the first subgroup use the first and sixth sub-frame (counted from the top) of the radio frame and the mobile transceivers of the second subgroup use the second and seventh sub-frame of the radio frame. The different sub-frame combinations, i.e. 1, 6 and 2, 7, correspond to subgroup specific RACHs. In this embodiment the base station transceiver apparatus 20 provides separate access channels for different user classes by assigning different radio resources to the different classes through the radio or network management functions.

In some embodiments, control module 14 of the base station transceiver apparatus 10 is operable to broadcast or multicast information related to the first subgroup of radio resources from the plurality of radio resources and information related to the second subgroup of radio resources from the plurality of radio resources. For example, such communication may be part of a system information multicast. In other words, the base station transceiver apparatus 10 may provide additional user group specific system information, which may be multicast/broadcast on a system broadcast channel. The system broadcast channel may be dedicated to the special user groups/subgroups of mobile transceivers.

For example, the control module 14 of the base station transceiver apparatus 10 may be operable to secure the information related to the second subgroup of radio resources from the plurality of radio resources based on access information shared with the second subgroup of mobile transceivers. Such a securing may be carried out be using encryption, keys, codes, scrambling codes, interleavers, etc. On the mobile transceiver 200 side the control module 24 may be operable to determine the subgroup of radio resources based on access information received from the base station transceiver 100.

In some embodiments information related to the access resources may be secured by providing the subgroups with specific Radio Network Temporary Network Identifiers (RNTI), for example a Cell RNTI (C-RNTI). In general, RNTIs are used to identify mobile transceivers in a communication network 400, e.g. in UTRAN or E-UTRAN. Such temporary identities are assigned in different situations, for example, a C-RNTI is a 16-bit long identifier, which is assigned to a mobile transceiver or UE when accessing a cell and it may be changed as the mobile transceiver hands over to a different cell. The C-RNTI may then be used by the mobile transceiver to identify data packets addressed to said mobile transceiver.

In some embodiments provision of these C-RNTIs may be carried out in a non-public way to the terminals/mobile transceivers of the special user (sub)groups, so that they are not publicly known like the C-RNTI used for System Information Broadcast (SIB). Together with, for example, C-RNTI dependent scrambling this mechanism may provide a basic mechanism to hide the access resources from other user (sub) groups. In some embodiments even stronger security measures may be taken, but the above described measure may be considered sufficient to provide protection against, for example, misbehaving terminals due to e.g. programming errors.

In further embodiments other or even stronger protection measures may be applied. For example, a more secure RACH may be established using a different random access channel resource allocation method. In a conventional RACH the RACH resources may be semi-statically allocated by means of sub-frames and resource blocks permanently reserved for RACH access. Some embodiments may secure random access channel resource allocation by allocating these resources dependent from a key and a (sub-) or frame numbering in a way such that without the key it is not possible to regenerate such sequences. These parameters are input for a cryptographic function, which provides pseudo-random allocations of the resource block allocations.

Figure 4:
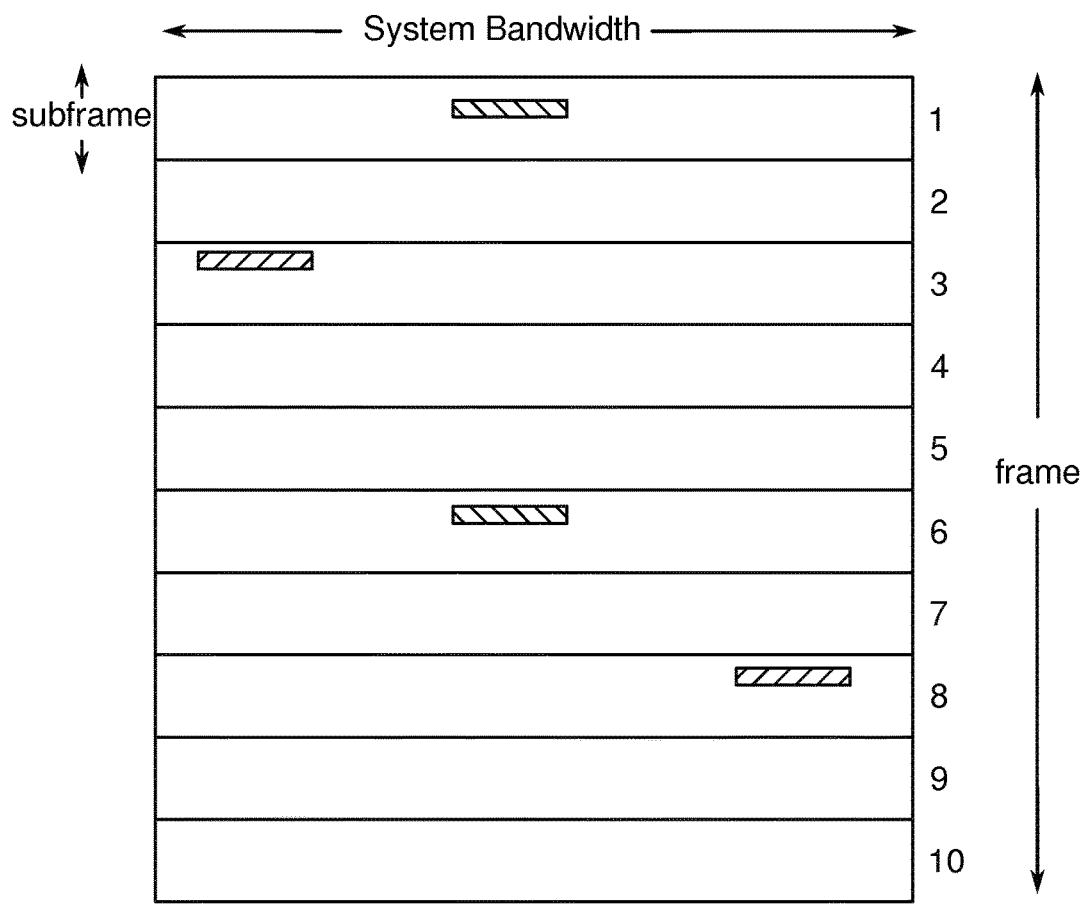
FIG. 4 illustrates another embodiment with access resource separation for different user subgroups with enhanced security.

In other words, generally in some embodiments the control module 14 of the base station transceiver apparatus 10 may be operable to vary the second subgroup of radio resources over time, and/or the control module 14 may be operable to vary the second subgroup of radio resources in a time-frequency hopping scheme. Accordingly, the control module 24 of the mobile transceiver apparatus 20 may be operable to determine the subgroup of radio resources according to a time-frequency hopping scheme. The access radio resources for the second subgroup of mobile transceivers may then be allocated non-permanently or in a time changing manner. FIG. 4 illustrates another embodiment with access resource separation for different user subgroups with enhanced security. FIG. 4 shows a similar view graph as FIG. 3. As can be seen in FIG. 4 the RACH access resources for the PSDR users are varied in time (sub-frame) and frequency, e.g. sub-carrier allocation.

In the embodiment illustrated by FIG. 4 both the UEs of a specific user group and the cell/base station providing the random access are in possession of the key and the frame numbers, both are in knowledge of the actual RACH resources to be used. Other terminals or attackers not knowing the key are not aware which resources are actually used for random access and can therefore not disturb or jam these resources.

In other words, in some embodiments the control module 14 of the base station transceiver apparatus 10 is operable to keep the access information unknown to the first subgroup of mobile transceivers. As mentioned above, the access information may correspond to, for example, a key, a code, etc. The control module 24 of the mobile transceiver apparatus 20 is operable to determine the subgroup of radio resources based on access information received from the base station transceiver 100. In other embodiments the control module 24 of the mobile transceiver apparatus 20 may be operable to determine the subgroup of radio resources based on access information from a storage module 26 comprised in the mobile transceiver 200. The storage module 26 may correspond to the above storage module 26. In other words, the mobile transceiver apparatus 20 may use information stored to obtain or to determine the information on the access information. For example, a SIM module may store a code or key that allows to decode or to decrypt the access information provided by the base station transceiver apparatus 10. For example, a SIM module may comprise information needed to determine the access information such that other mobile transceivers, which are not in possession of a SIM module with this information, cannot determine the access information easily. For example, a SIM module may comprise information on what the access resources of a base station transceiver 100 are, e.g. based on an identification of the base station transceiver. In other embodiments a SIM module may comprise information on a method or an algorithm on how the access resources can be determined for a given base station transceiver 100.

In some embodiments the control module 14 of the base station transceiver apparatus 10 is operable to provide information related to the access information to the second subgroup of mobile transceivers using a communication path dedicated to one or more mobile transceivers of the second subgroup of mobile transceivers. That is to say, once a first connection between a mobile transceiver of the second subgroup and the base station transceiver has been established, such a dedicated connection (and its given protection provided by the system) may be used to inform the mobile transceiver on the access resources or an algorithm or method to determine the access resource for a subsequent connection establishment or access.

In embodiments different variants for RACH resource generation key distribution are possible. For example, a specific user class or subgroup of mobile transceivers and a cell/base station share a common communication key (stored or communicated on a secured connection) used to encrypt/decrypt the resource generation key, which is distributed by the above described system information multicast. Additionally or alternatively, cell/base station and user/mobile transceiver class share a common key used to generate the resource generation key. In this case only an input parameter for this key generation may be communicated via the system information multicast.

In general, any secret or key exchange procedure may be used to make information on the access resources or involved keys or codes available to the mobile transceivers of the second group. For example, a mobile transceiver may have to build up a regular connection to the network and then register or authenticate with some other network entity. For example, a security token for local key generation, a smart card, a security card, such as Homebanking Computer Interface (HBCI), may be used to register/authenticate with a secure entity in the network, which then provides access information to a mobile transceiver. The mobile transceiver may then subsequently be able to identify and use the access resources assigned to the second subgroup, or the mobile transceiver may then be assigned to or associated with the second subgroup.

In some embodiments such a secret, which may be stored in the storage module, may be changed, e.g. after it has been compromised. For example, SIM modules may be reprogrammed, e.g. using so-called SIM tool kits. Furthermore, key or code revocation may be used, such that compromised mobile transceivers or storage modules can be excluded from the access of the second user group. For example, in the operation of some systems in embodiments a list of certificates or mobile transceiver identities/user identities that have been revoked may be distributed. Coding measures may be applied to encoded or encrypted access information such that the comprised entities may no longer gain access.

Figure 5:
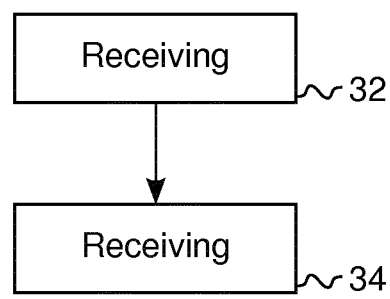
FIG. 5 illustrates a block diagram of a flow chart of an embodiment of a method for a base station transceiver.

FIG. 5 illustrates a block diagram of a flow chart of an embodiment of a method for a base station transceiver 100 of a communication system 400. The method comprises receiving 32 access messages from a first subgroup of one or more mobile transceivers from the plurality of mobile transceivers using a first subgroup of the plurality of radio resources. The method further comprises receiving 34 access messages from a second subgroup of one or more mobile transceivers from the plurality of mobile transceivers using a second subgroup of the plurality of radio resources.

Figure 6:
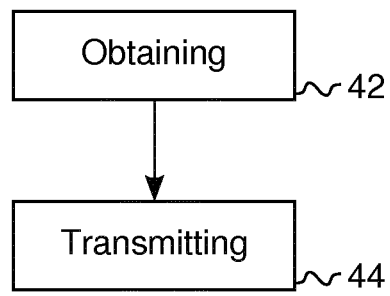
FIG. 6 illustrates a block diagram of a flow chart of an embodiment of a method for a mobile transceiver.

FIG. 6 illustrates a block diagram of a flow chart of an embodiment of a method for a mobile transceiver 200 of a communication system 400. The method comprises obtaining 42 information related to a subgroup one or more mobile transceivers the mobile transceiver 200 is associated with. The method further comprises transmitting 44 an access message to a base station transceiver 100 using a subgroup of a plurality of radio resources. The subgroup of radio resources is based on the information related to the subgroup the mobile transceiver 100 is associated with.

Embodiments may enable the possibility of sharing networks of commercial operators and, for example, PSDR operators by providing a secure procedure to avoid congestions on the network access for a special user group.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transceiving", "means for controlling", "means for storing" etc., may be provided through the use of dedicated hardware, such as "a transceiver", "a controller/processor", "a memory", "a storage" etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for a base station transceiver of a communication system, the apparatus comprising
a transceiver operable to communicate radio signals between the base station transceiver and a plurality of mobile transceivers using a plurality of radio resources; and
at least one processor operable to:
control the transceiver,
receive access messages from a first subgroup of one or more mobile transceivers from the plurality of mobile transceivers using a first subgroup of the plurality of radio resources, and
receive access messages from a second subgroup of one or more mobile transceivers from the plurality of mobile transceivers using a second subgroup of the plurality of radio resources,
wherein the at least one processor is operable to secure information related to the first subgroup of the plurality of radio resources based on first access information shared with the first subgroup of one or more mobile transceivers,
wherein the at least one processor is operable to secure information related to the second subgroup of the plurality of radio resources based on second access information shared with the second subgroup of one or more mobile transceivers,
wherein the at least one processor is operable to apply a first security level to information related to the first subgroup of the plurality of radio resources,
wherein the at least one processor is operable to apply an enhanced security level to information related to the second subgroup of the plurality of radio resources as compared to the first security level applied to information related to the first subgroup of the plurality of radio resources.

2. The apparatus of claim 1, wherein the first subgroup of one or more mobile transceivers from the plurality of mobile transceivers and the second subgroup of one or more mobile transceivers from the plurality of mobile transceivers comprise different mobile transceivers, and/or wherein the first subgroup of one or more mobile transceivers from the plurality of mobile transceivers and the second subgroup of one or more mobile transceivers from the plurality of mobile transceivers correspond to different classes of users.

3. The apparatus of claim 1, wherein the first subgroup of the plurality of radio resources and the second subgroup of the plurality of radio resources are non-overlapping, and/or
wherein the first subgroup of the plurality of radio resources and the second subgroup of the plurality of radio resources are comprised in different access channels.

4. The apparatus of claim 1, wherein the plurality of radio resources correspond to time and frequency resources of a carrier of the communication system.

5. The apparatus of claim 1, wherein the at least one processor is operable to broadcast information related to the first subgroup of the plurality of radio resources and information related to the second subgroup of the plurality of radio resources.

6. The apparatus of claim 1, wherein the at least one processor is operable to keep the second access information unknown to the first subgroup of one or more mobile transceivers.

7. The apparatus of claim 1, wherein the at least one processor is operable to vary the second subgroup of the plurality of radio resources over time, and/or
wherein the at least one processor is operable to vary the second subgroup of the plurality of radio resources in a time-frequency hopping scheme.

8. The apparatus of claim 1, wherein the at least one processor is operable to provide information related to the second access information to the second subgroup of one or more mobile transceivers using a communication path dedicated to one or more mobile transceivers of the second subgroup of one or more mobile transceivers.

9. An apparatus for a mobile transceiver of a communication system, the apparatus being operable to obtain information based on which the mobile transceiver determines its mobile transceiver subgroup assignment, the apparatus comprising
a transceiver operable to communicate radio signals between the mobile transceiver and a base station transceiver using a plurality of radio resources; and
at least one processor operable to:
control the transceiver,
obtain information related to an assigned subgroup of one or more mobile transceivers with which the mobile transceiver is associated, the assigned subgroup of one ore more mobile transceiver being from a plurality of mobile transceivers, and
transmit an access message to a base station transceiver using an assigned subgroup of the plurality of radio resources, wherein a first subgroup of one or more mobile transceivers from the plurality of mobile transceivers uses a first subgroup of the plurality of radio resources and a second subgroup of one or more mobile transceivers from the plurality of mobile transceivers uses a second subgroup of the plurality of radio resources, wherein the assigned subgroup of the plurality of radio resources is based on information related to the assigned subgroup of one or more mobile transceivers with which the mobile transceiver is associated;
wherein the at least one processor is operable to determine the first subgroup of the plurality of radio resources based on first secured access information received from the base station transceiver,
wherein the at least one processor is operable to determine the second subgroup of the plurality of radio resources based on second secured access information received from the base station transceiver,
wherein the at least one processor is operable to apply a first security level to information related to the first subgroup of the plurality of radio resources,
wherein the at least one processor is operable to apply an enhanced security level to information related to the second subgroup of the plurality of radio resources as compared to the first security level applied to information related to the first subgroup of the plurality of radio resources.

10. The apparatus of claim 9, wherein the at least one processor is operable to receive information related to the assigned subgroup of the plurality of radio resources from the base station transceiver, and/or
wherein the at least one processor is operable to determine the assigned subgroup of the plurality of radio resources according to a time-frequency hopping scheme.

11. The apparatus of claim 9, wherein the at least one processor is operable to receive information related to the assigned subgroup of one or more mobile transceivers with which the mobile transceiver is associated from the base station transceiver, or
wherein the at least one processor is operable to obtain the information related to the assigned subgroup of one or more mobile transceivers with which the mobile transceiver is associated from a storage device comprised in the mobile transceiver.

12. The apparatus of claim 9, wherein the at least one processor is operable to determine the assigned subgroup of the plurality of radio resources based on access information from a storage device comprised in the mobile transceiver.

13. A method for access resource management in a base station transceiver of a communication system, comprising
receiving access messages from a first subgroup of one or more mobile transceivers from a plurality of mobile transceivers using a first subgroup of a plurality of radio resources, the plurality of radio resources facilitating communication of radio signals between the base station transceiver and the plurality of mobile transceivers;
receiving access messages from a second subgroup of one or more mobile transceivers from the plurality of mobile transceivers using a second subgroup of the plurality of radio resources;
securing information related to the first subgroup of the plurality of radio resources based on first access information shared with the first subgroup of one or more mobile transceivers; and
securing information related to the second subgroup of the plurality of radio resources based on second access information shared with the second subgroup of one or more mobile transceivers;
wherein a first security level is applied to information related to the first subgroup of the plurality of radio resources;
wherein an enhanced security level is applied to information related to the second subgroup of the plurality of radio resources as compared to the first security level applied to information related to the first subgroup of the plurality of radio resources.

14. A non-transitory computer-readable medium storing program instructions that, when executed by a computer, a processor, or a programmable hardware component, cause an apparatus for the base station transceiver to perform the method of claim 13.

15. The method of claim 13, further comprising:
keeping the second access information unknown to the first subgroup of one or more mobile transceivers.

16. The method of claim 13, further comprising:
providing information related to the second access information to the second subgroup of one or more mobile transceivers using a communication path dedicated to one or more mobile transceivers of the second subgroup of one or more mobile transceivers.

17. The method of claim 13, wherein the plurality of radio resources correspond to time and frequency resources of a carrier of the communication system.

18. A method for facilitating access resource management in a mobile transceiver of a communication system, comprising
obtaining information based on which the mobile transceiver determines its mobile transceiver subgroup assignment;
obtaining information related to an assigned subgroup of one or more mobile transceivers with which the mobile transceiver is associated, the assigned subgroup of one or more mobile transceivers being from a plurality of mobile transceivers;
transmitting an access message to a base station transceiver using an assigned subgroup of a plurality of radio resources, the plurality of radio resources facilitating communication of ratio signals between the base station transceiver and the plurality of mobile transceivers, wherein the assigned subgroup of the plurality of radio resources is based on information related to the assigned subgroup of one or more mobile transceivers with which the mobile transceiver is associated, wherein a first subgroup of one or more mobile transceivers from the plurality of mobile transceivers uses a first subgroup of the plurality of radio resources and a second subgroup of one or more mobile transceivers from the plurality of mobile transceivers uses a second subgroup of the plurality of radio resources;
determining the first subgroup of the plurality of radio resources based on first secured access information received from the base station transceiver; and
determining the second subgroup of the plurality of radio resources based on second secured access information received from the base station transceiver,
wherein a first security level is applied to information related to the first subgroup of the plurality of radio resources;
wherein an enhanced security level is applied to information related to the second subgroup of the plurality of radio resources as compared to the first security level applied to information related to the first subgroup of the plurality of radio resources.

19. A non-transitory computer-readable medium storing program instructions that, when executed by a computer, a processor, or a programmable hardware component, cause an apparatus for the mobile transceiver to perform the method of claim 18.

20. The method of claim 18, further comprising:
determining the assigned subgroup of the plurality of radio resources based on access information from a storage device comprised in the mobile transceiver.

* * * * *